2,923,308
IRRIGATION COUPLER GASKET

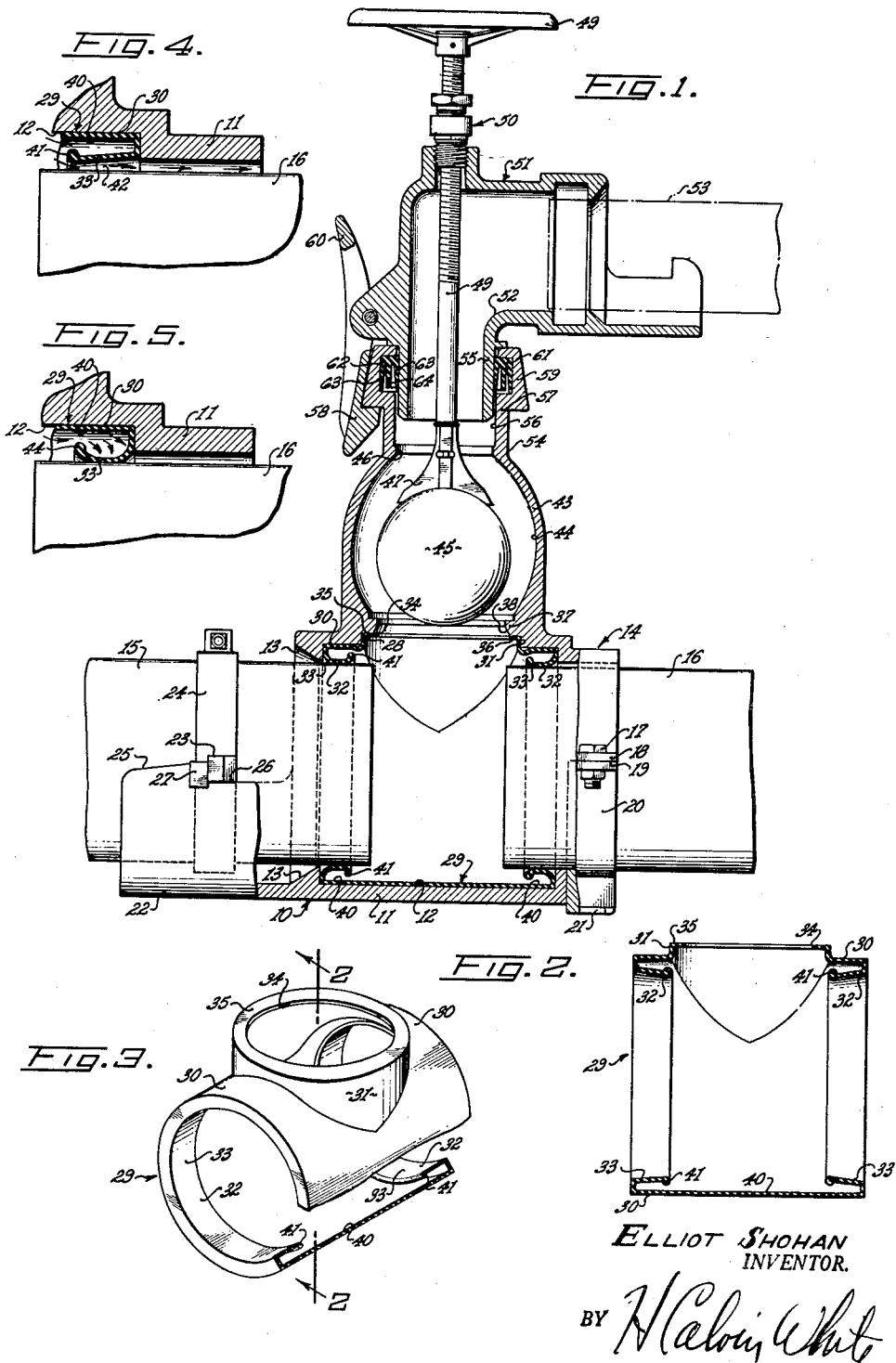

Elliot Shohan, San Bernardino, Calif.

Application July 1, 1957, Serial No. 669,072

4 Claims. (Cl. 137—107)

This invention relates generally to irrigation equipment, and more specifically has to do with means for preventing sand or grit clogging the coupling locations between lengths of irrigation pipe connected together, so that the pressure flow of water through the piping may remain unobstructed. This application is a continuation-in-part of my co-pending application entitled "Valve," Serial No. 471,397, filed November 26, 1954.

Speaking with respect to the operation of former irrigation pipe couplers, it has been found that sanding, or build-up of sand particles, within the coupler passage in and around the coupled together irrigation pipe ends spaced apart in the passage presents a serious problem from the standpoint of efficient operation of the irrigation system. Not infrequently, a large number of couplers are required to connect the irrigation pipe in end-to-end relation for a considerable distance, as across a large field, and sanding within the couplers resulting from the flow of grit containing water within the line causes an increasing pressure drop in the couplers and results in the loss of pressure in the sprinklers supplied by the coupled together line.

The use of known type gaskets for sealing off between the pipe ends in the coupler connecting them together has not resulted in the elimination of the sanding problem, and it has been found that gritty particles tend to lodge in crevices between conventional gaskets and the wall forming the coupler passage into which the pipe ends extend. The problem is aggravated when the couplers are formed so as to pass water from the main through passage to a side branch line connected into the main passage through side openings in the couplers, since the points at which sand can then collect in the coupler are multiplied.

The present invention has been found to alleviate the sanding problem in both straight-through irrigation pipe couplers and also those of the type having side openings, as for example valved couplers which will be described below, to the extent that not only is an excellent seal against leakage maintained between the pipe ends and the coupler body, but more importantly the coupler assembly is self-flushing as respects sand particles introduced by water passing through the coupler. In accordance with the foregoing, the coupler is specifically formed to accommodate a novel elastomer gasket which completely covers the coupler interior wall forming the flow passage into which the pipe ends extend, the gasket including a pair of flexible annular seals forming ports receiving the pipe ends so that these seals may be displaced by water pressure into annular sealing engagement with the pipes. Since the gasket continuously covers the passage forming wall, and seals off against the pipe ends, sand particles cannot possibly lodge between the gasket and the coupler body so as to build-up and cause a sanding problem resulting in flow pressure loss. Furthermore, the preferably tubular-shaped rubber gasket has annular seals which are re-entrant into the gasket hollow in spaced relation from the gasket tube, with the result that all portions of the gasket interior or hollow freely intercommunicate, and sand particles introduced therein by the pressure flow are flushed outward and downstream with respect to the gasket.

The invention particularly concerns the provision of a novel one-piece gasket which extends continuously in covering relation with the passage forming wall of a coupler having an upward extending side passage intersecting the horizontal main through passage, the gasket having a side port in the coupler side passage and formed by an annular seal pressure displaced upwardly against an annular shoulder of the coupler to seal off therebetween at the top of the gasket. As a result, sand particles cannot lodge between the gasket and the coupler at the side or upper gasket port location due to the maintenance of the seal, and also because the heavier sand particles tend to be passed straight through the gasket and the pipes below the upper side port.

Finally, the invention concerns the provision of novel annular seals adapted to be pressure displaced into annular engagement with the coupled together pipes and otherwise to be retracted from sealing engagement therewith so as to permit remanent water drainage from the gasket and outwardly around the pipes when the flow pressure has been shut off. For this purpose, the flexible rubber seals are stiffened by thickening the re-entrant annular ends thereof, in such a way that these latter form ports slightly larger than the pipes received therethrough, other portions of the seals being thinner so as to be more readily pressure displaced against the pipes. These thinner portions are then retractable out of pipe engagement by the stiffer or thickened seal ends when the flow pressure is discontinued.

Other features and objects of the invention, as well as the details of an illustrative embodiment, will be more fully understood from the following detailed description of the drawings, in which:

Fig. 1 is a vertical section taken through a valved pipe coupler and valve opener interconnected therewith;

Fig. 2 is a vertical section taken through the gasket shown in Fig. 1;

Fig. 3 is a perspective view of the gasket;

Fig. 4 is an enlarged fragmentary elevation showing the position of the gasket seal during water drainage from the gasket; and Fig. 5 is a view similar to Fig. 4 showing the seal pressure displaced against the coupled pipe during pressure flow through the coupler.

In Fig. 1 there is shown an integral pipe coupler body 10 including a cylindrical lightweight metal housing 11 forming a horizontal endwise extending passage 12 having opposite end openings formed by an annular ramp 13 and a split clamp 14, the openings receiving the ends of lightweight irrigation pipes 15 and 16 as shown.

Pipe 16 is clamped into position by tightening a bolt 17 passing through flanges 18 and 19 of the upper and lower split clamp parts 14 and 20, so that the removable lower clamp part is held firmly to the upper clamp part integral with the clamp body. The lower part 20 is provided with a wide flat base 21 for squarely seating a coupler on the ground against overturning, the base extending laterally with respect to the axis of the passage 12 in order to prevent coupler overturning.

Projecting from the opposite open end of the coupler is a semi-cylindrical guide 22 which opens upwardly for receiving the end portion of pipe 15. The end of the latter is guided by the tapered ramp 13 into the coupler passage 12 during rapid makeup of suitable lengths of irrigation pipes, as assisted by engagement of a pair of oppositely extending lugs 23 carried by a pipe clamp 24 against the laterally spaced upwardly sloping upper edges 25 of the guide. Upon entrance of the end of pipe 15 into passage 12 the laterally extending lugs 23 drop downward into notches 26 recessed into the laterally opposite sides of the guide. Thereafter, engagement of the lugs 23 against corresponding lugs 27 carried by the guide prevents withdrawal of the pipe 15 from the coupler, unless of course the pipe 15 is lifted so as to disengage lugs 23 and 27.

Fitted into the recessed horizontal endwise extending passage 12 in the coupler and also into a short vertical passage 28 extending upwardly through the body side and communicating with passage 12 is an inverted T-shaped relatively thin rubber gasket 29, including tubular portions 30 and 31 extending respectively horizontally and vertically in said passages. The gasket continuously covers the passage forming walls intermediate the endwise spaced ports 32 formed by a pair of flexible annular seals 33 and reduced side port 34 formed by a flexible annular seal 35 extending in the passage 28. Seal 35 is normally urged upwardly into sealing engagement with an annular shoulder 36 at the underside of an annular constriction 37 by compressive bending of tubular portions 30 adjacent portion 31 and acting to urge the latter upwardly. This action is brought about by making the length of portions 31 slightly greater than that of passage 28. The construction 37 forms a reduced opening 38 through which water may flow upwardly at pressure reduced in relation to the water pressure exerted upwardly against the seal 35, thereby ensuring its positive sealing engagement against the shoulder 36. The tubular portion 31 of the gasket also engages the bore of passage 28 and holds the gasket against any bodily displacement in the coupler body.

The flexible annular seals 33 re-entrant oppositely into the gasket bore 40 formed by tubular portions 30 are normally urged by the water pressure in the gasket into annular sealing engagement against the pipe ends received through the gasket endwise openings 32, as shown in Fig. 1. Referring to Figs. 4 and 5, the flexible seals are annularly thickened at their terminal ends, as by the bead 41 shown, in relation to the remainder of the seals extending adjacent the bead. Furthermore, the ports 32 formed by the seals when no pressure is exerted thereagainst are of larger cross section than the pipe ends inserted therethrough, as better shown in Fig. 4. Thus, when the water pressure is turned off, any water standing in the irrigation line will drain out through the spaces or gaps 42 between the pipe ends of the retracted annular seals 33, so that the operator may disassemble the portable irrigation equipment without having to lift any water therein. On the other hand, when the water pressure is turned on, it displaces the flexible thinner portions of the seals 33, as better shown in Fig. 5, into pressure sealing engagement with the pipes to seal off escape of the water from the line. Upon initial application of water pressure, a very small amount of water escapes through the gaps 42 between the undisplaced seals 33 so as to flush out any sand particles standing on the pipe surface, which particles would otherwise prevent efficient sealing engagement of the annuli 33 against the pipe. The thickened annular bead 41, which is not readily annularly displaced against the pipe, acts to bodily retract the thinner seal portions when the water pressure is turned off.

Referring again to Fig. 1, extending upwardly from the coupler body 10 is an integral valve housing 43 forming a valve chamber 44 communicating with the opening 38 therebelow, and within which a suitable valve body such as the ball valve 45 shown is located. The ball valve, preferably formed of rubber, is free to drop to a lower position in the chamber against the annular construction 37 when the water pressure is turned off, and rises to close the smaller chamber outlet 46 when the water pressure is turned on and when the valve is not forcibly opened or displaced by the cradle 47 carried by the lower end of a threaded valve stem 48. The latter is actuated up and down by a handwheel 49 through a threaded bushing assembly 50 carried by valve opener elbow 51. When the valve 45 is displaced, fluid flowing through the gasket 29 may discharge upwardly through the chamber 44 and through the elbow passage 52 into a pipe lateral 53 suitably connected into the elbow discharge. On the other hand, when the valve 45 has seated upwardly against the reduced chamber wall 54 below the outlet 46, no water can flow upwardly through the chamber 44.

When it is desired attach the opener 51 to the coupler so as to displace the valve 45 sealing off against water discharge through the outlet 46, the elbow stem 55 is stabbed downward into a passage 56 formed by the cylindrical neck 57 integral with the housing 43, as shown. During such stabbing, a latch head 58 rides downward and outward against frusto-conical hub 59 until the latch head clears the bottom hub and thereafter pivots under the hub into the position shown in Fig. 1. Thereafter, water pressure exerted upwardly against the elbow 51 cannot dislodge it from coupled engagement with the hub, until such time as the latch handle 60 is annularly pivoted to disengage the latch head from the hub.

A suitable annular T-shaped seal 61 received within an annular recess 62 sunk into the hub includes a pair of annular lips 63 sealing off against the hub and the elbow stem 55 under the action of water pressure received against the lips. The seal itself is stiffened against blow-out or other inadvertent removal from the hub by a central thickened section 64.

It has been found that whereas former irrigation pipe couplers become clogged with said build-up within the coupler passages and especially around gaskets therein, the present coupler is self-flushing as respects grit or sand formation therein. This feature is attributable to the use of the particular gasket shown and described in the coupler body, the gasket extending in continuous relation with the passage chamber walls, except of course for the ports 32 and 34 formed by the gasket.

I claim:

1. The combination, comprising an irrigation pipe coupler body adapted to be supported with its underside facing the ground and forming two intersecting substantially cylindrical passages respectively extending horizontally endwise through the body and laterally upwardly through the body side above the horizontal passage, means holding a pair of pipe ends inserted oppositely through the body endwise passage openings, and a relatively thin rubber gasket extending horizontally in the body endwise passage in continuous covering relation with said endwise passage forming wall, said gasket including a pair of flexible annular seals forming horizontally endwise spaced ports through which said pipe ends extend, said seals being re-entrant oppositely into the gasket endwise tubular portion and displaced radially from surface portions of said pipe ends, an upwardly projecting tubular portion on said gasket having a radially inwardly extending flexible annular lip forming an upwardly opening side port in registration with said body side passage for flowing gritty fluid under pressure through the gasket, said seals being pressure displaced into annular engagement with the pipe ends and continuously sealing off the space between the pipe ends and the covered passage forming walls under flow pressure conditions, said body having a downwardly facing annular shoulder against which said annular lip is adapted to be pressed by said fluid pressure for sealing off between the body and gasket at said gasket side port and body side passage locations, said gasket engaging the body side passage wall for resisting inadvertent gasket endwise displacement within said body endwise passage and said gasket being removable from said body endwise passage only after the upwardly projecting tubular portion of the gasket is displaced downwardly from said body side passage.

2. The invention as defined in claim 1 in which the coupler body endwise passage wall is annularly recessed and said gasket is received in the annular recess.

3. The invention as defined in claim 2 in which said flexible seals are annularly thickened at their terminal ends and are relatively thinner adjacent said terminal ends.

4. The combination comprising an irrigation pipe coupler body forming two intersecting passages respectively extending horizontally endwise through the body and laterally upwardly through the body side, a pair of pipe ends inserted oppositely through the body endwise passage openings, means holding the pipes in said end inserted condition, and an elastomer gasket extending in the body endwise passage in continuous covering relation with body endwise passage forming wall, said gasket including a pair of flexible annular seals forming endwise spaced ports through which said pipe ends extend, said seals being re-entrant oppositely into the gasket endwise tubular portion, an upwardly projecting tubular portion on said gasket having a radially inwardly extending flexible annular lip forming a side port in registration with the body side passage for flowing gritty fluid under pressure through the gasket, said seals being pressure displaced into annular engagement with the pipe ends and sealing off the space between the pipe ends and the covered passage forming walls under flow pressure conditions, said body having a downwardly facing annular shoulder against which said annular lip is adapted to be pressed by said fluid pressure for sealing off between the body and gasket at said gasket side port and body side passage locations, said seals being annularly thickened at their terminal ends and relatively thinner adjacent said thickened ends, said thickened seal ends being radially outwardly spaced from the pipe ends extending therethrough, and said gasket engaging the body side passage wall for resisting inadvertent gasket endwise displacement within said body endwise passage and said gasket being removable from said body endwise passage only after the upwardly projecting tubular portion of the gasket is displaced downwardly from said body side passage.

References Cited in the file of this patent
UNITED STATES PATENTS

| | | |
|---|---|---|
| 1,276,394 | Monrath | Aug. 20, 1918 |
| 2,036,320 | Connelly et al. | Apr. 7, 1936 |
| 2,184,376 | Beyer et al. | Dec. 26, 1939 |
| 2,286,623 | Kellaher et al. | June 16, 1942 |
| 2,355,408 | Wyss | Aug. 8, 1944 |
| 2,463,235 | Andrews | Mar. 1, 1949 |
| 2,635,901 | Osborn | Apr. 21, 1953 |